United States Patent
Ogino et al.

(10) Patent No.: US 6,195,129 B1
(45) Date of Patent: Feb. 27, 2001

(54) VIDEO SIGNAL TRANSMISSION DEVICE, VIDEO SIGNAL OUTPUT DEVICE, VIDEO SIGNAL RECEPTION DEVICE, VIDEO SIGNAL DUPLICATION CONTROL SYSTEM, INFORMATION SUPERIMPOSING/EXTRACTION DEVICE, AND IMAGE RECORDING MEDIUM

(75) Inventors: Akira Ogino, Chiba; Takehiro Sugita, Kanagawa; Takashi Usui, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/957,933

(22) Filed: Oct. 27, 1997

(30) Foreign Application Priority Data

Nov. 1, 1996 (JP) ............................................. 08-307063

(51) Int. Cl.[7] ........................... H04N 7/04; H04N 7/167; H04N 5/91
(52) U.S. Cl. ................. 348/469; 348/465; 380/201; 380/203; 380/268; 380/255; 386/94; 375/130
(58) Field of Search ............................ 348/469, 465, 348/461, 460, 6, 7; 713/176; 455/3.1, 6.1, 62, 6.3; 386/94, 46, 1; 360/60; 380/200–205, 255, 268, 274; 375/130–153, 367; H04N 7/04, 7/167, 5/91

(56) References Cited

U.S. PATENT DOCUMENTS

| | | |
|---|---|---|
| 3,838,444 | 9/1974 | Loughlin et al. ................ 348/486 |
| 3,984,624 | 10/1976 | Waggener ....................... 348/473 |
| 5,157,688 * | 10/1992 | Dell-Imagine ................... 375/130 |
| 5,204,875 * | 4/1993 | Mower et al. ................... 375/150 |
| 5,436,941 * | 7/1995 | Dixon et al. ................... 375/206 |
| 5,661,750 * | 8/1997 | Fulton ............................ 375/208 |

FOREIGN PATENT DOCUMENTS

| | | | |
|---|---|---|---|
| 0360615 | 3/1990 | (EP) | ............ H04N/7/08 |
| 0400906 | 12/1990 | (EP) | ............ H04N/5/91 |
| 0574892 | 12/1993 | (EP) | ............ H04N/9/80 |

* cited by examiner

Primary Examiner—Andrew I. Faile
Assistant Examiner—Vivek Srivastava
(74) Attorney, Agent, or Firm—Jay H. Maioli

(57) ABSTRACT

An image transmission method, image anti-duplication method, image anti-duplication device, and image recording medium in which information for anti-duplication control is superimposed on a video signal without deterioration of the resultant video signal and the information is extracted accurately and quickly to perform anti-duplication control. An output device starts generation of pseudo-noise (PN) corresponding to a PN code start timing signal generated based on a video sync signal. One chip interval of the PN code is divided into a plurality of divided chips corresponding to a PN code inversion timing signal HT, and an original value of a chip is inverted on an alternate one divided interval to generate a PN inversion code. An anti-duplication control signal is subjected to spectral spreading using the PN inversion code and superimposed on the video signal. In the recording device which receives the video signal from the output device, inversion spectral spreading is performed based on the PN inversion code generated in the same way as that generated in the output device.

22 Claims, 11 Drawing Sheets

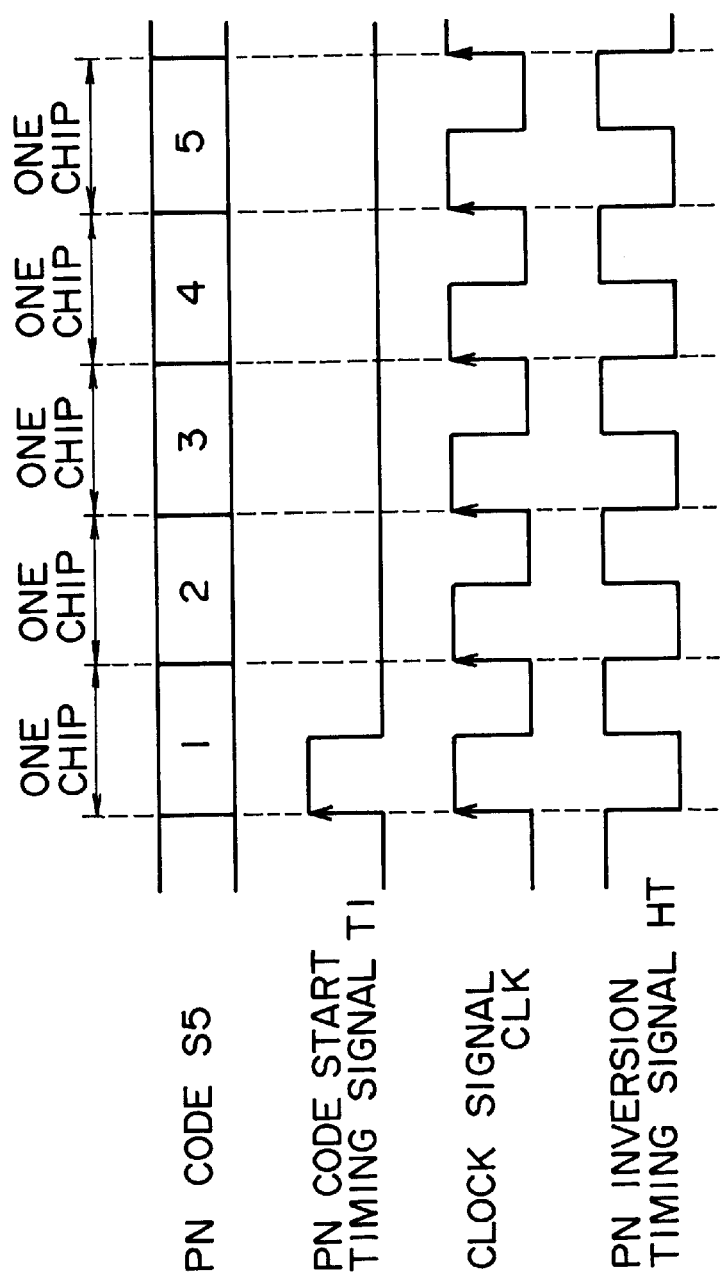

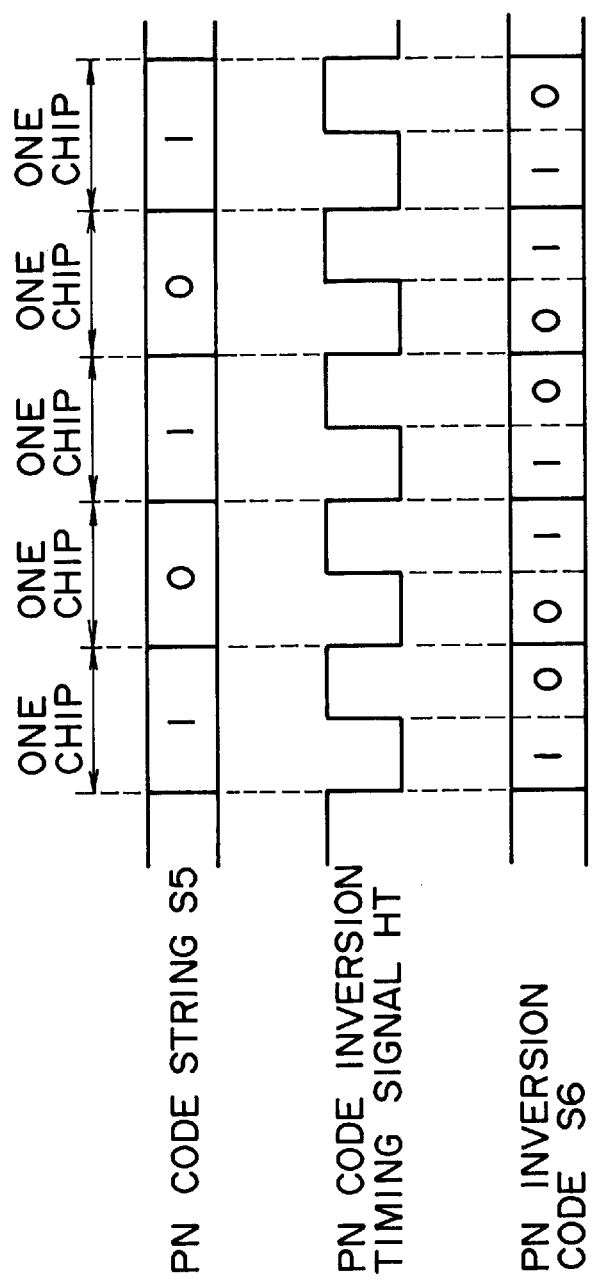

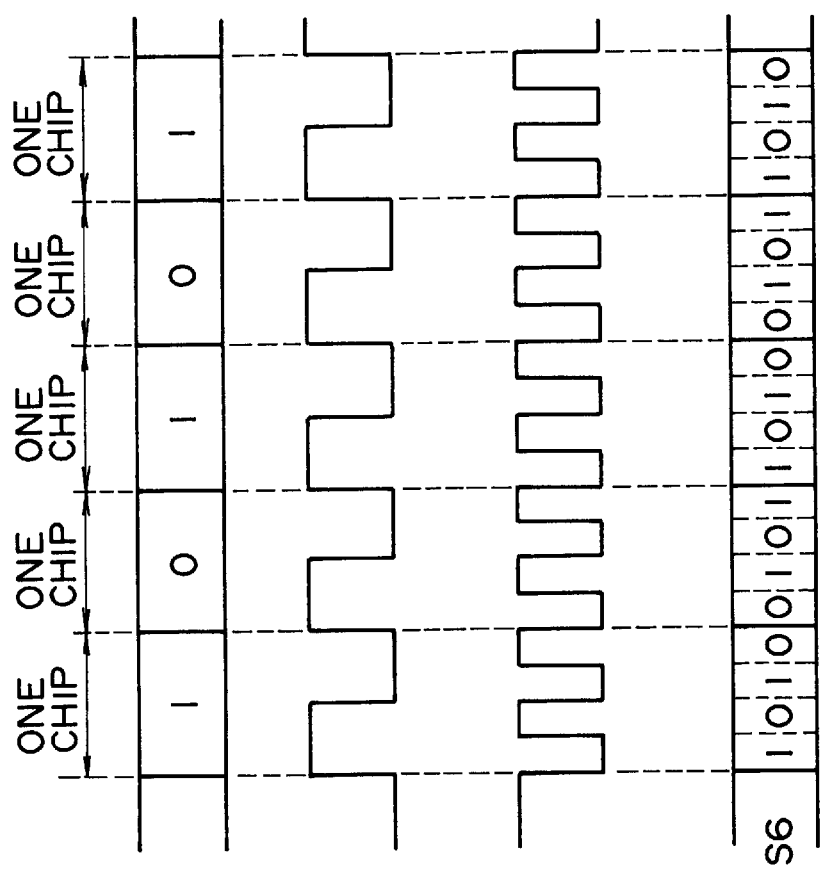
FIG. 8A PN CODE STRING S5
FIG. 8B CLOCK SIGNAL CLK
FIG. 8C PN CODE INVERSION TIMING SIGNAL HT
FIG. 8D PN INVERSION CODE S6

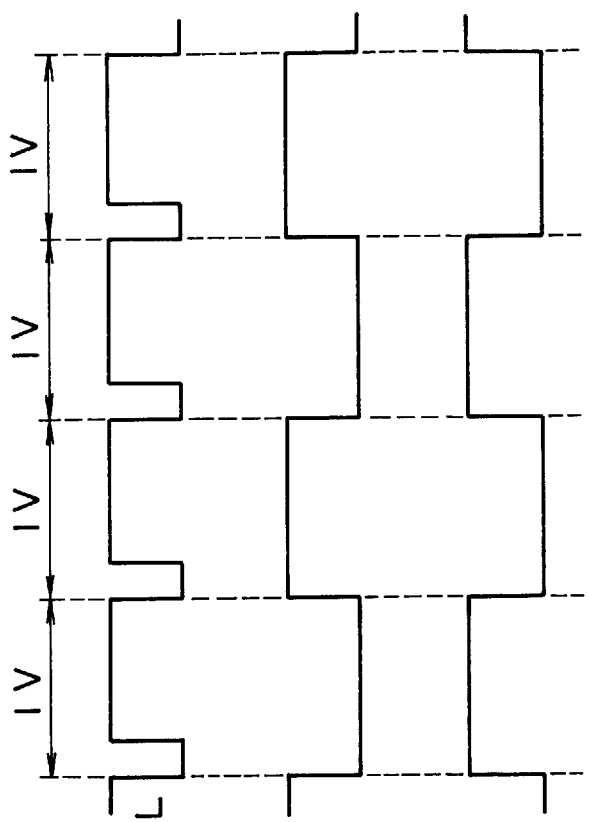

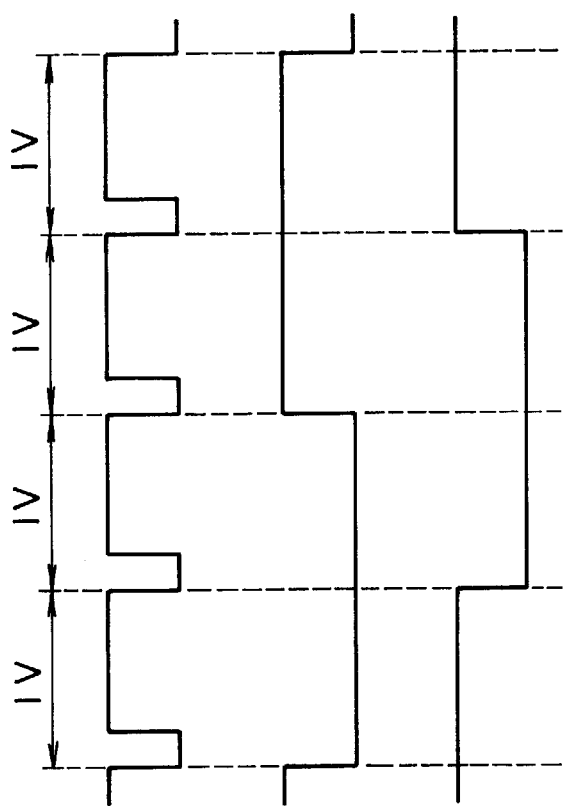

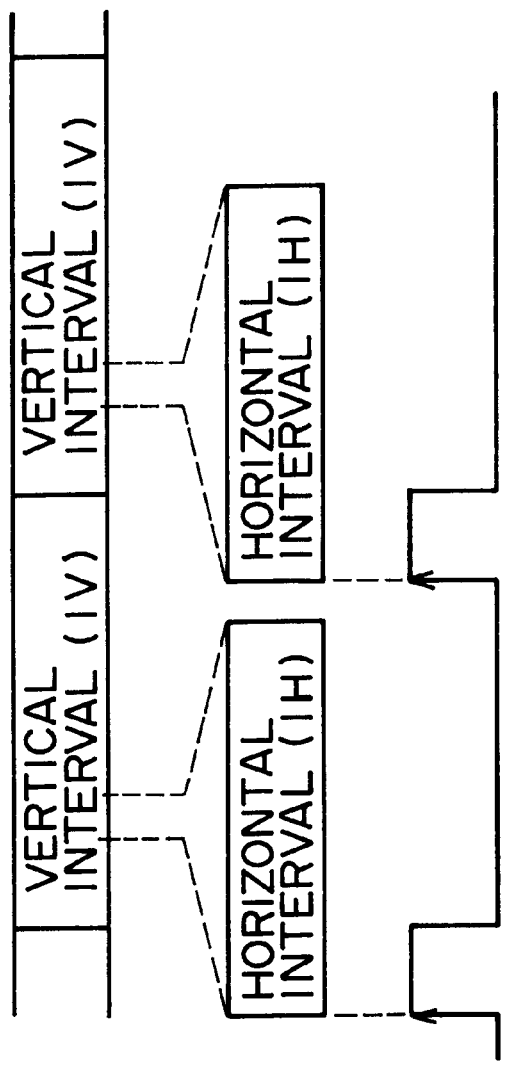

VIDEO SIGNAL TRANSMISSION DEVICE, VIDEO SIGNAL OUTPUT DEVICE, VIDEO SIGNAL RECEPTION DEVICE, VIDEO SIGNAL DUPLICATION CONTROL SYSTEM, INFORMATION SUPERIMPOSING/ EXTRACTION DEVICE, AND IMAGE RECORDING MEDIUM

BACKGROUND OF THE INVENTION

This invention relates to an image duplication control system for playing back a video signal recorded on a recording medium, and limiting or preventing the reproduced video signal from being played back and recorded on another recording medium. It also relates to an image playback device, image recording device and image recording medium on which a video signal is recorded which use this image duplication control system.

VTR (Video Tape recording devices) has been popularized in daily life, and many kinds of software which can be played back on a VTR are supplied abundantly. Digital VTR or DVD (Digital Video Disks) playback devices have been available practically now, and provide images and sound of exceptionally high quality.

There is, however, a problem in that this great abundance of software can be copied without restriction, and several methods have already been proposed to inhibit duplication.

For example, for a VTR which outputs an analog video signal, one method to prevent copying uses a difference in the AGC (Automatic Gain Control) system, or in the APC (Automatic Phase Control) system, of the VTR recording device and of a monitor receiver which displays the image.

When the VTR employs AGC using a pseudo sync signal inserted in the video signal, a monitor receiver employs AGC which does not use this pseudo sync signal. In this anti-duplication method using a difference in the type of AGC, a very high level pseudo sync signal is inserted and output in the video signal supplied from the playback VTR to the recording VTR as an AGC sync signal.

When the VTR employs APC using the phase of a color burst in the video signal, the monitor receiver uses a different type of APC. In an anti-duplication method using a difference in the type of APC, the phase of the color burst in the video signal supplied from the playback VTR to the recording VTR is partially inverted.

The monitor receiver which receives the analog video signal from the playback VTR plays back the image correctly without being affected by the high level pseudo sync signal in AGC or the partial phase inversion of the color burst signal in APC.

On the other hand, when a VTR records, on a recording medium, the analog video signal into which pseudo sync signals have been inserted or the analog video signal which has been subjected to color burst signal phase inverting control in the playback VTR as described herein above, proper gain control or phase control based on the input signal cannot be performed, and so the video signal is not correctly recorded. Even if this signal is played back, therefore, normal picture and sound cannot be obtained.

In the case of a digitized video signal, for example, in a digital VTR, an anti-duplication signal or an anti-duplication control signal comprising, for example, a duplication ranking control code, is added as digital data to the video signal and recorded on the recording medium, so as to prevent or control duplication of the image.

In this case, the playback digital VTR reads the video signal, audio signal and anti-duplication control signal, and supplies them as digital or analog data to a recording digital VTR.

In the digital VTR being used as a recording device, the anti-duplication control signal is extracted from the supplied playback signal, and recording of the playback signal is then controlled based on the anti-duplication control signal. For example, when the anti-duplication control signal comprises an anti-duplication signal, the recording VTR does not perform recording.

Alternatively, when the anti-duplication control signal comprises a copy ranking control code, recording is controlled by this ranking control code. For example, when the copy ranking code limits duplication to one copy, the digital VTR used for recording adds this anti-duplication code before recording the video signal and audio signal on the recording medium as digital data. It is thereinafter impossible to duplicate the video signal from the copy.

Hence, in the case of a digital connection when the video signal, the audio signal, and the anti-duplication control signal used as digital signals are supplied to the digital VTR used as a recording device, anti-duplication control is performed on the recording side using the anti-duplication control signal by supplying this signal to the digital VTR as digital data.

However, in the case of an analog connection where the video signal and audio signal are supplied as analog signals, the anti-duplication control signal is lost when the signal supplied to the recording device is D/A converted. Hence, in the case of an analog connection, an anti-duplication control signal must be added to the D/A converted image or sound signal, and this causes deterioration of the video signal and audio signal.

It is, therefore, difficult to add an anti-duplication control signal and to extract it in the recorder for the purpose of anti-duplication control, without causing deterioration of the D/A converted video signal or audio signal.

Conventionally, therefore, in the case of an analog connection, duplication was prevented by an anti-duplication method using a difference in the AGC, or a difference in APC characteristics, between the VTR and the monitor receiver as described herein above.

However, in some cases, when anti-duplication is prevented using the above-mentioned difference in the AGC or a difference in APC characteristics between the VTR and the monitor receiver, depending on the type of AGC or APC characteristics on the recording side, the video signal may nevertheless be correctly recorded. In this case, it might happen that duplication cannot be prevented, or that the reproduced image on the monitor receiver is distorted. Further, it was troublesome to change over the anti-duplication method depending on whether there was an analog connection or a digital connection.

The inventors have already proposed an anti-duplication method in which a spectrally spread anti-duplication control signal is superimposed on a video signal (U.S. patent application No. 08175510). This method may be used for both digital connections and analog connections, and it causes no deterioration of the image or sound which is played back.

According to this method, when the original recording medium is fabricated, a PN (Pseudorandom Noise) sequence code (referred to hereinafter as PN code) used as a spreading code is generated with a sufficiently short period and spectrally spread by multiplying it by the anti-duplication control signal. In this way, a narrow bandwidth, high level anti-duplication control signal is converted to a wideband, low level signal which does not affect the video signal or sound signal. This spectrally spread anti-duplication control signal is then superimposed on the video signal supplied to the recording medium, and recorded.

On the other hand, in the recording side, a PN code is generated at the same timing and phase as the PN code used for spectral spreading in the playback device relative to the video signal supplied by the playback device. The generated PN code is multiplied by the video signal on which the anti-duplication control signal is superimposed so as to extract the original anti-duplication control signal, that is, so as to perform inversion spectral spreading. Anti-duplication is then controlled based on the anti-duplication control signal extracted by inversion spectral spreading.

In this way, the anti-duplication control signal is spectrally spread and superimposed on the video signal as a wideband, low level signal in the playback device. It is therefore difficult for a person who wishes to illegally duplicate the video signal, to remove the anti-duplication control signal which is superimposed on it.

However, it is possible for a person who wants to prevent illegal duplication to detect the superimposed anti-duplication control signal by inversion spectral spreading, and use it. This anti-duplication control signal is therefore supplied to the recording device together with the video signal. In the recording side, the anti-duplication control signal is detected, and duplication is consistently controlled according to the detected anti-duplication control signal.

According to this method, as described herein above, the spectrally spread anti-duplication control signal is superimposed as a wideband, low level signal on the video signal, but it must be superimposed at a lower S/N ratio than that of the video signal in order for the video signal not to cause deterioration of the video signal.

To superimpose the spectrally spread anti-duplication control signal at a lower S/N ratio than that of the video signal, and to be able to detect the anti-duplication control signal superimposed on the video signal in the recording device, the number of the PN codes (PN code length) required to spectrally spread a 1 bit anti-duplication control signal must be sufficiently large. The PN code length per bit of the anti-duplication control signal may also be expressed as a spread gain (spread factor) which is the ratio (T/TC) of a time width T per bit of the anti-duplication control signal and a time width TC of one part (one chip) of the PN code. As described hereinafter, this spread gain is found from the S/N ratio of the information signal on which the anti-duplication control signal is superimposed, in this case the S/N ratio of the video signal.

For example, when the S/N ratio of the video signal on which the anti-duplication control signal is superimposed is 50 dB, the anti-duplication control signal which is spectrally spread and superimposed on the video signal must be superimposed at a lower level than 50 dB, which is the S/N ratio of the video signal. Also, in order to detect the anti-duplication control signal superimposed on the video signal, its S/N ratio must be sufficient for the spectrally spread signal to be fully demodulated. If this S/N ratio is 10 dB, a spread gain of 60 dB (S/N ratio of 50 dB for the video signal)+(S/N ratio of 10 dB necessary for detection) is required. In this case, the PN code length per bit of the anti-duplication control signal is a 1 million code length.

The method used in the recording device to detect the PN code superimposed on the video signal uses a matched filter or a sliding correlation. In the former case, the PN code is detected quickly, but only a short code length can be detected. At present, this code length is of the order of 256, and when the PN code length is 1 million per bit of the anti-duplication control signal, it cannot be detected. In the latter case, PN codes of long length can be detected but the detection takes a long time. It can thus be anticipated that a considerable time is required to detect a PN code having a length of 1 million.

Moreover, if the superimposition level of the spectrally spread anti-duplication control signal is too high, the anti-duplication control signal causes serious visual interference and becomes remarkable visually.

It is the object of this invention, in view of the above, to superimpose the additional information on a video signal for controlling duplication of the video signal without causing deterioration, and to control such duplication by accurately and quickly extracting this additional information.

SUMMARY OF THE INVENTION

To solve the above-mentioned problem, the image transmission method in accordance with the present invention described in claim 1 is the method for transmitting the analog video signal on which the spectrally spread anti-duplication control signal is superimposed comprises the steps of:

generating the spreading code repeatedly every period synchronously with the sync signal in the video signal, generating the inversion spreading code which is chip inverted every divided interval by dividing the chip interval of the above-mentioned spreading code into N (N is an integer of 2 or larger) divided intervals and by inverting the original chip value on alternate one divided interval of the N divided intervals, and performing spectral spreading on the anti-duplication control signal using the above-mentioned inversion spreading code.

The image transmission method in accordance with the present invention described in claim 2 comprises the steps of:

receiving the analog video signal on which the spectrally spread anti-duplication control signal is superimposed using the inversion spreading code composed of divided intervals which are chip inverted every divided interval formed by dividing a chip interval of the spreading code repeated every prescribed period synchronously with the video sync signal into N (N is an integer of 2 or larger) divided intervals and by inverting the value of the N divided intervals on alternate one divided interval, generating the spreading code for inversion spreading which is synchronously with the sync signal in the received video signal and is repeating every period which is equal to the above-mentioned prescribed period, generating inversion spreading code for inversion spreading which is chip inverted every divided interval by dividing a chip interval of the above-mentioned spreading code for inversion spreading into the above-mentioned N divided intervals and by inverting the original chip value of the N divided intervals on alternate one divided interval correspondingly to the above-mentioned inversion spreading code, and performing inversion spectral spreading using the above-mentioned inversion spreading code for inversion spreading to extract the above-mentioned anti-duplication control signal which is superimposed on the above-mentioned video signal.

The image transmission method in accordance with the present invention described in claim 8 is the image transmission method for transmitting the analog video signal on which the spectrally spread anti-duplication control signal is superimposed comprising the steps of:

generating the spreading code which repeats every first period synchronously with the sync signal in the video signal, generating the inversion spreading code which is chip inverted every second period by inverting all the chip values of the above-mentioned spreading code on alternate one second period which is different from the above-mentioned first period, wherein the interval of the above-mentioned video signal having a correlation is defined as one period, and performing spectral spreading on the above-mentioned anti-duplication control signal using the above-mentioned inversion spreading code.

The image transmission method in accordance with the present invention described in claim 10 comprises the steps of:

receiving the analog video signal on which the spectral spreading anti-duplication control signal is superimposed using the inversion spreading code which is chip inverted every one period of the above-mentioned second period in which all the chip values of the spreading code repeated every first period synchronously with the sync signal in the video signal are inverted in the interval repeated on alternate one period of the second period which is different from the above-mentioned first period, wherein the interval of the above-mentioned video signal having a correlation is defined as one period, generating the spreading code for inversion spreading which repeats every first period synchronously with the sync signal in the received video signal, generating the inversion spreading code for inversion spreading which is chip inverted every second period by inverting all the chip value of the above-mentioned spreading code in the interval repeating on alternate one period equal to the above-mentioned second period synchronously with the above mentioned second period in which all the chips of the above-mentioned spreading code for inversion spreading is inverted, and performing inversion spectral spreading using the above-mentioned inversion spreading code for inversion spreading to extract the above-mentioned anti-duplication control signal superimposed on the above-mentioned video signal.

According to the image transmission method in accordance with the present invention described in claim 1, in the output side, the spreading code repeats every prescribed period synchronously with the video sync signal. The chip interval of the spreading code is divided, for example, into two divided intervals, the value of the divided intervals is inverted on an alternate one divided interval, and the inversion spreading code which is chip inverted every divided interval is generated. The anti-duplication control signal is spectrally spread using this inversion spreading code and superimposed on the video signal, and outputted.

According to the image transmission method in accordance with the present invention described in claim 2, the spreading code for inversion spreading repeated every period equal to the above-mentioned prescribed period is used at the output side synchronously with the sync signal in the received video signal received from the output side. The chip interval of the spreading code is divided, for example, into two divided intervals as in the same way as described for the output side, the value of these divided intervals is inverted on an alternate one divided interval.

Thereby, the inversion spreading code for inversion spreading which is chip inverted every divided interval is generated as in the output side, and inversion spectral spreading is performed using the inversion spreading code for inversion spreading. The anti-duplication control signal which is superimposed on the video signal is extracted by performing the inversion spectral spreading, and anti-duplication control of the video signal is performed based on the extracted anti-duplication control signal.

As described herein above, in the inversion spectral spreading of the video signal performed in the reception side, inversion spectral spreading should be performed using the same spreading code as used in spectral spreading in the output side performed on the video signal supplied from the output side.

As described herein above, the spreading code is generated so as to repeat every prescribed period synchronously with the video sync signal separated from the video signal. As a result, corresponding to the video sync signal, the spreading code for inversion spreading generated in the reception side is generated at the same timing as that of the spreading code used for spectral spreading in the output side.

Further, each chip interval of the spreading code used for spectral spreading in the output side and the spreading code for inversion spreading to be generated in the reception side are divided into a plurality of divided intervals, and the divided intervals are chip inverted on an alternate one divided interval so that the polarity is inverted every one divided interval. Herein, the term chip inversion is defined as the operation that the original chip value is inverted. For example, in the case that the original chip value is "1", the value is changed to "0" by chip inversion, and conversely in the case that the original chip value is "0", the value is changed to "1" by chip inversion.

Therefore, in the case that one chip interval is divided into four divided intervals, and if the chip is chip inverted on an alternate one divided interval and the value of the chip is "1", then the value of the respective divided intervals is "1, 1, 1, 1" and then the value is changed to "1, 0, 1, 0" by inverting the value on an alternate one divided interval. In the same way, if the value of the chip is "0", the value of the respective divided intervals is "0, 0, 0, 0", and then the value is changed to "0, 1, 0, 1" by inverting the value on an alternate one divided interval. As a result, the inversion spreading code having the polarity differentiated every one divided interval is generated.

In the reception side, in the same way as performed in the output side, one chip is divided into a plurality of divided intervals, inversion spectral spreading is performed using the spreading code for inversion spreading which is the chip inverted so that the polarity is differentiated every one divided interval, and the additional information which is spectrally spread and superimposed on the video signal is detected.

When inversion spectral spreading is performed, the playback signal including the spectrally spread anti-duplication control signal is multiplied by the inversion spreading code having the polarity differentiated every one divided interval as described herein above, and results are integrated, thereby the anti-duplication control signal superimposed on the playback signal is extracted. In this case, because the inversion spreading code having the polarity differentiated every one divided interval is multiplied by the playback signal, the polarity of the video signal component in the playback signal is inverted every one divided interval.

The video signal is a signal having a high correlation between adjacent pixels. Therefore, in integral processing for inversion spectral spreading, the video signal component having the polarity differentiated alternately in one chip is canceled by integration and is offset.

For example, in the case that one chip interval of the spreading code corresponds to two pixels of the video signal, the polarity of the spreading code and video signal is inverted between adjacent pixels. In this case, because the correlation of the video signal corresponding to the adjacent pixels having the opposite polarity is high, these video signal components having the opposite polarity cancel each other and offset. In other words, by utilizing the correlation in the horizontal scanning line direction of the video signal, the video signal component is canceled every divided interval formed by dividing one chip interval into a plurality of divided intervals when inversion spectral spreading is performed, and the anti-duplication control signal is detected easily.

As described herein above, because the polarity is inverted every divided interval formed by dividing one chip interval into a plurality of divided intervals, even in the case of the active dynamic image, the video signal component is canceled efficiently when inversion spectral spreading is performed as described herein above, and the anti-duplication control signal is extracted accurately and quickly.

Thereby, the additional information which is spectrally spread and superimposed on the video signal is detected and the detection efficiency of the additional information is improved without adverse effect of the high level video signal component. Accordingly, the detection efficiency of the additional information superimposed on the video signal is improved and the spread gain is reduced.

Because one chip interval of the spreading code is divided into a plurality of divided intervals and the value of these divided intervals is inverted on an alternate one divided interval, the polarity of the anti-duplication control signal to be superimposed on the video signal is inverted correspondingly to the multiplied spreading code. In this case, a brightness change of the anti-duplication control signal superimposed on the video signal is inverted between adjacent anti-duplication control signals having opposite polarity like the polarity inversion of every field and polarity inversion of every horizontal scanning interval of a color sub-carrier of the color video signal, and the anti-duplication control signal is averaged and diminished visually. Thus, the visual interference of the played back image due to superimposition of the anti-duplication control signal is diminished visually.

According to the video signal transmission method in accordance with the present invention described in claim 8, for example, the spreading code which repeats every first period synchronously with the vertical sync signal in the video signal is generated, and all the chips of the spreading code in the interval repeated on an alternate one period of the second period which is different from the first period and is synchronous, for example, with a horizontal signal are inverted. The anti-duplication control signal is spectrally spread using the inversion spreading code generated as described herein above, and superimposed on the video signal and outputted.

According to the video signal transmission method in accordance with the present invention described in claim 10, like the inversion spreading code which is generated by spectrally spreading the anti-duplication control signal superimposed on the received video signal, for example, the spreading code for inversion spreading which repeats every same period as the first period synchronously with the vertical sync signal is generated.

Then, the inversion spreading code for inversion spreading having all the chips of the spreading code for inversion spreading inverted in the same interval as that of the inversion spreading code which is generated by spectrally spreading the anti-duplication control signal synchronously with the above-mentioned second period is generated. Inversion spectral spreading is performed using the inversion spreading code for inversion spreading, and the anti-duplication control signal superimposed on the video signal is extracted. The anti-duplication control of the video signal is performed using the extracted anti-duplication control signal.

Thereby, like the image transmission method described in the above-mentioned claim 1 and claim 2, the spreading code can be generated at the same timing as the video sync signal in both the output side and reception side of the video signal.

In both the output side and reception side, all the chip values of the spreading code in the interval repeated every one period of the above-mentioned second period are inverted, and spectral spreading and inversion spectral spreading are performed using the inversion spreading code which is chip inverted every one period of the second period. As a result, the video signal component of the playback signal multiplied by the inversion spreading code for inversion spectral spreading has the polarity inverted every one period of the second period. the video signal component having the polarity inverted every one period of the second period is offset by integration, and the additional information superimposed on the video signal can be extracted without adverse effect of the video signal component. Thus, the detection efficiency of the anti-duplication control signal which is spectrally spread and superimposed on the video signal is improved.

Also as described herein above, the polarity of the anti-duplication control signal to be superimposed on the video signal is inverted correspondingly to the spreading code to be multiplied. Therefore, because a brightness change of the anti-duplication control signal superimposed on the video signal is inverted between adjacent anti-duplication control signals having opposite polarity, the anti-duplication control signal is averaged and diminished visually. Thus, the visual interference of the played back image due to the superimposed anti-duplication control signal is diminished visually.

BRIEF DESCRIPTION OF THE DRAWINGS

FIGS 6A to 6D are diagrams for describing an example of an inversion timing of a PN code chip in the image output device and image recording device to which the image transmission method of the present invention is applied.

FIGS. 7A to 7C are diagrams for describing an example of a PN code chip inversion timing and PN inversion code in the image output device and image recording device to which the image transmission method of the present invention is applied.

FIGS. 8A to 8D are diagrams for describing another example of a PN code chip inversion timing and PN inversion code in the image output device and image recording device to which the image transmission method of the present invention is applied.

FIGS. 9A to 9C are diagrams for describing further another example of a PN code chip inversion timing in the image output device and image recording device to which the image transmission method of the present invention is applied.

FIGS. 10A to 10C are diagrams for describing yet another example of a PN code chip inversion timing in the image output device and image recording device to which the image transmission method of the present invention is applied.

FIGS. 11A to 11C are diagrams for describing another example of a PN code generation start timing in the image output device and image recording device to which the image transmission method of the present invention is applied.

DETAILED DESCRIPTION OF THE PREFERRED EMBODIMENTS

An embodiment of the image transmission method, image anti-duplication method, image anti-duplication device, and image recording medium of the present invention will be described in detail hereinafter with reference to the drawings.

In the following description of the embodiment, it will be assumed that the image playback device and image recording device are used as an image anti-duplication device of the present invention. Also it is assumed that both the image playback device and image recording device are devices used as a recording/playback device of a DVD (Digital Video Disc) (referred to as DVD device hereinafter). To simplify the description, the audio signal system will be omitted.

As will be described in detail hereinafter, in the image duplication control system described below, an anti-duplication control signal is superimposed as additional information in the information playback device using a PN (Pseudorandom Noise) sequence code (PN code). This code is spectrally spread with inversion in the information recording device so as to extract the anti-duplication control signal which is used to control duplication of the video signal.

Figure 1:
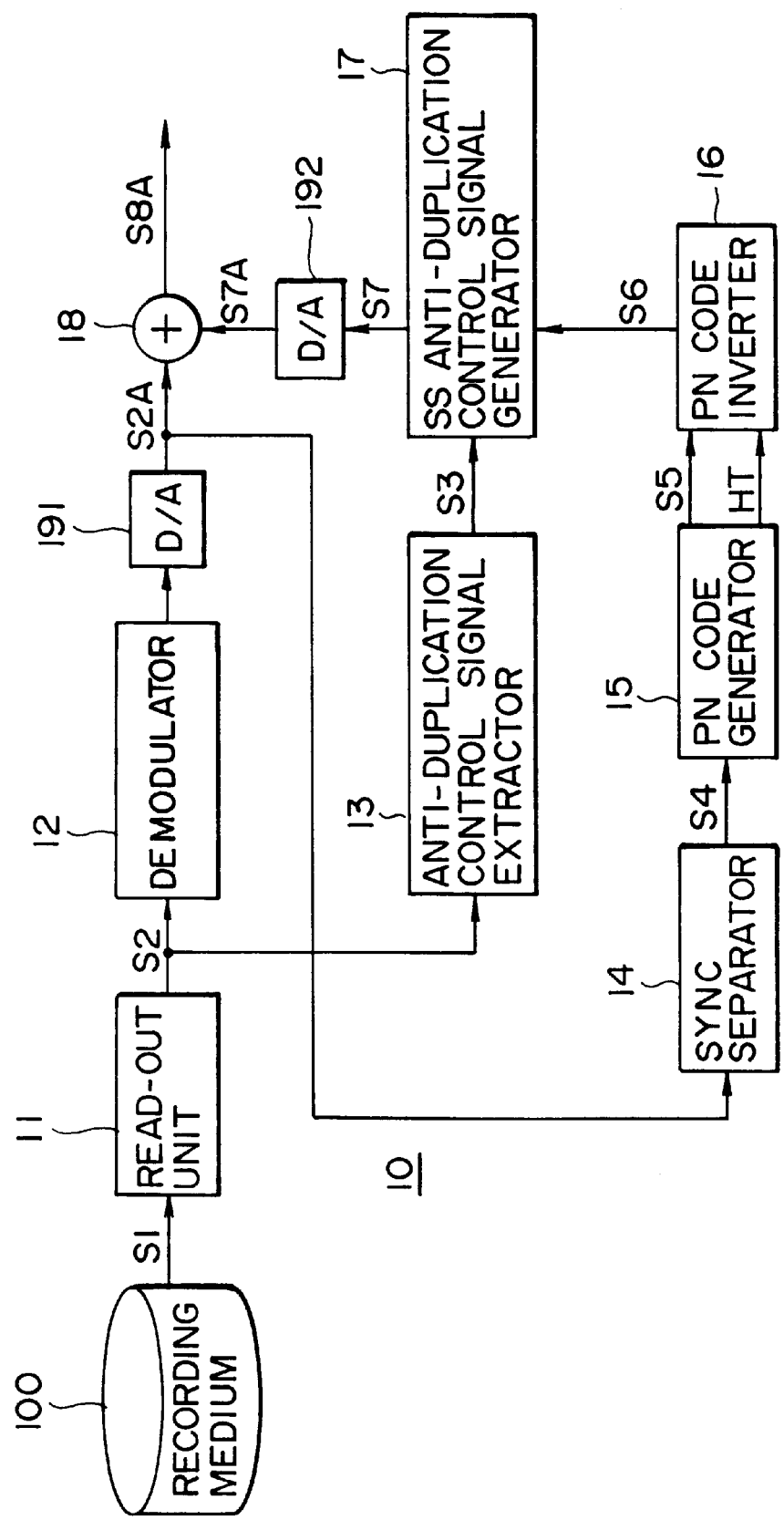
FIG. 1 is a block diagram for illustrating one embodiment of a video signal output device to which the image transmission method of the invention is applied.
Figure 2:
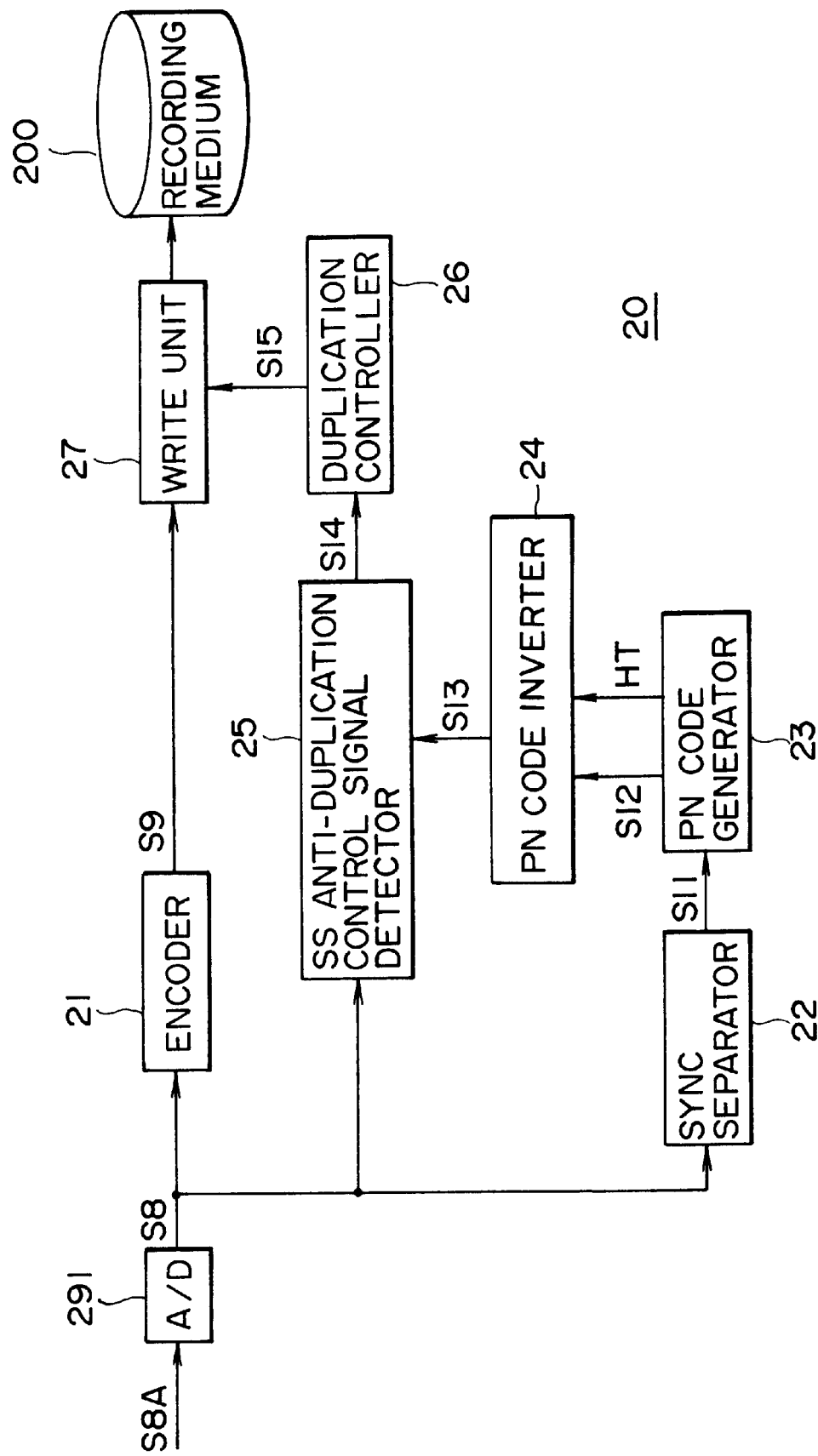
FIG. 2 is a block diagram for illustrating one embodiment of a video signal recording device to which the image transmission method is applied.

FIG. 1 and FIG. 2 are drawings for describing an image output device (referred to simply as output device hereinafter) 10 and an image recording device (referred to simply as recording device hereinafter) 20 used in an image anti-duplication system according to this embodiment. In other words, the output device 10 corresponds to the output system of a DVD device, and the recording device 20 corresponds to the recording system of a DVD device.

In FIG. 1, on a recording medium 100 that is a DVD in this case, digitized images and audio signals are recorded together with an anti-duplication control signal as additional information. The anti-duplication control signal may be recorded on the innermost or outermost TOC or a track area known as the directory, or it may be inserted on a track in which image data or audio data is recorded, namely, on the area different from the data recording area. Hereinafter, an example of the latter case that the anti-duplication control signal is read out at the same time as the video signal is described.

In this embodiment, to simplify the description, the anti-duplication control signal is a 1 bit signal for indicating inhibition or permission of a video signal duplication, and the anti-duplication control signal may be a signal for limiting the number of duplications such as a signal for permitting only the first duplication. The anti-duplication control signal is added in the video signal. The recording medium 100 is mounted on the output device 10, and the recorded signal is read out.

As shown in FIG. 1, the playback device 10 comprises a read-out unit 11, demodulator, 12, anti-duplication control signal extractor 13, sync separator 14, PN code generator 15, PN code inverter 16, spectrally spread anti-duplication control signal generator (referred to as SS hereinafter (SS is an abbreviation of spectral spreading) anti-duplication control signal generator) 17, adder 18 and D/A conversion circuits 191, 192.

The read-out unit 11 extracts a playback video signal component S2 from the playback signal S1 obtained from the recording medium 100, and supplies it to the demodulator 12 and anti-duplication control signal extractor 13.

The demodulator 12 demodulates the playback video signal component S2, generates a digital video signal, and supplies it to the D/A conversion circuit 191. The D/A conversion circuit 191 converts the digital video signal to an analog video signal S2A comprising a sync signal, and supplies the result to the sync separator 14 and adder 18.

The anti-duplication control signal extractor 13 extracts an anti-duplication control signal S3 added to the playback video signal component S2, and supplies the extracted anti-duplication control signal S3 to the SS anti-duplication control signal generator 17.

The sync separator 14 removes a video sync signal S4 from the analog video signal S2A, and supplies the result to the PN code generator 15. According to this embodiment, a horizontal sync signal is used as the video sync signal S4.

The PN code generator 15 generates a PN code (spreading code) using the horizontal sync signal S4 as a reference and forms various timing signals to be used in other processors. In detail, the PN code generator 15 functions as a spreading code generation means for generating a spreading code for spectral spreading.

Figure 3:
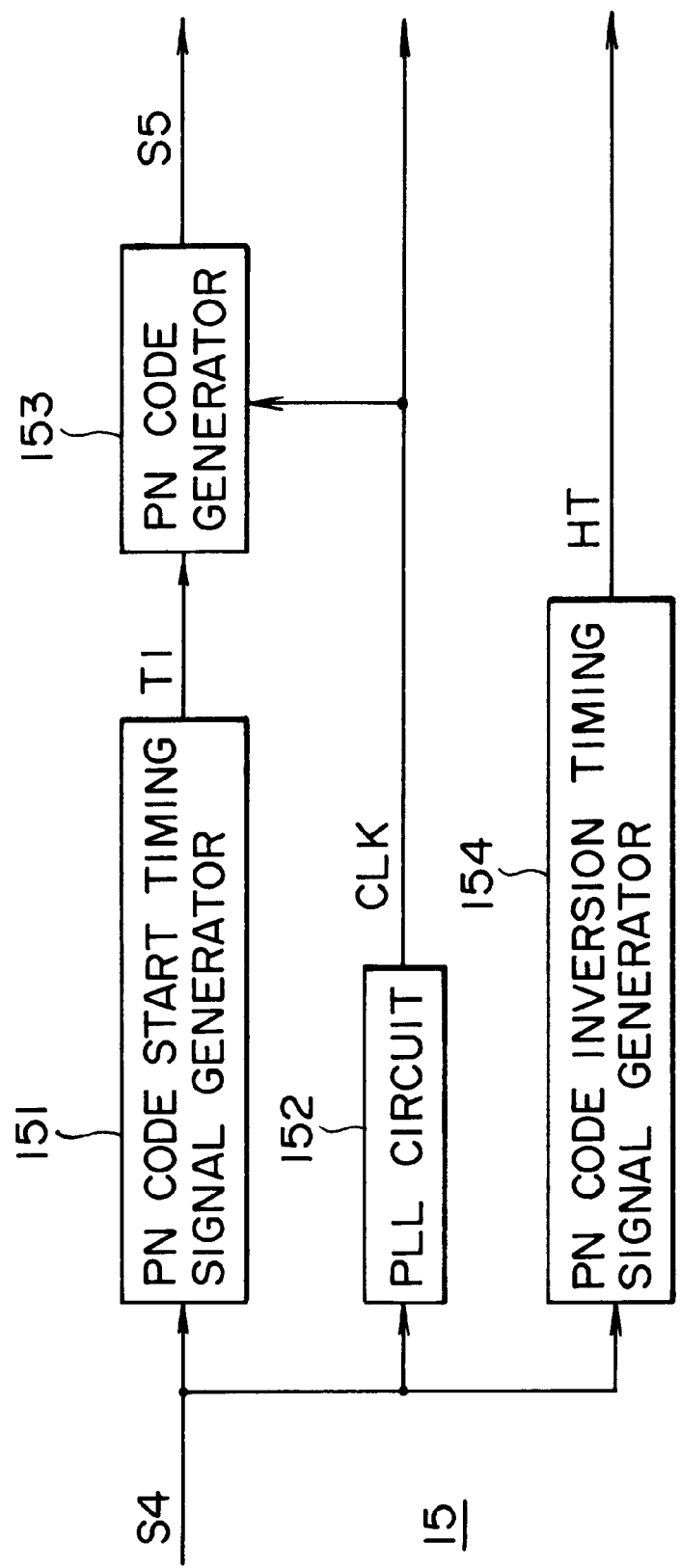
FIG. 3 is a block diagram for illustrating an exemplary PN code generator of the image output device and the image recording device shown in FIG. 1 and FIG. 2.

FIG. 3 is a block diagram for describing the PN code generator 15 of the output device 10. As shown in FIG. 3, the PN code generator 15 comprises a PN code start timing signal generator 151, PLL circuit 152, PN code generator 153, and PN code inversion timing signal generator 154. The horizontal sync signal S4 extracted in the sync separator 14 is supplied to the PN code start timing signal generator 151 of the PN code generator 15, the PLL circuit 152, and the PN code inversion timing signal generator 154.

The PN code start timing signal generator 151 generates a PN code start timing signal T1 (FIG. 4B) showing the timing at which the PN code starts to be generated, based on the horizontal sync signal S4 (FIG. 4A). The generated PN code start timing signal T1 is supplied to the PN code generator 153.

The PN code start timing signal T1 starts generation of PN code which repeats every one horizontal interval (described as 1 H in the figure) based on the front end of the horizontal sync signal S4.

The PLL circuit 152 generates a clock signal CLK based on the horizontal sync signal S4 supplied to it, and the clock signal is supplied to the PN code generator 153. The PLL circuit 152 generates a clock signal CLK of which the frequency is 250 kHz, as described hereinafter.

The PN code generator 153 determines the timing at which the PN code starts to be generated by the PN code start timing signal T1, generates a PN code S5 according to this clock signal CLK, and outputs the result.

Figure 4:
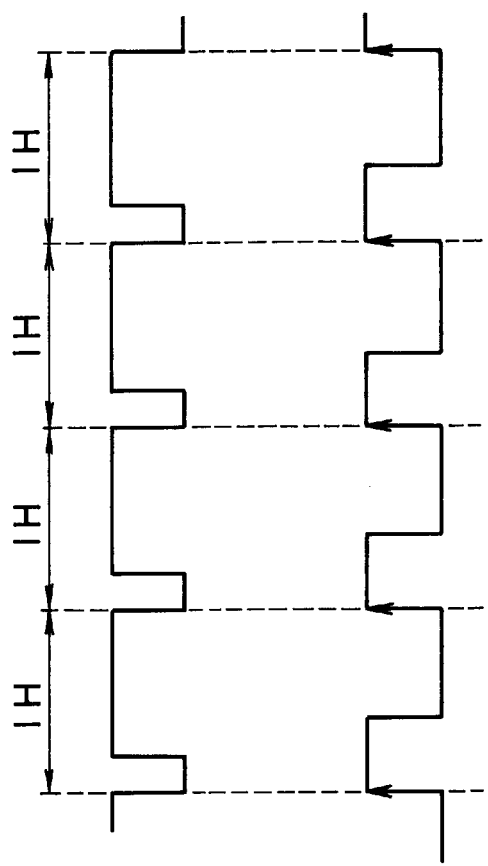
FIG. 4 is a diagram for describing an example of a PN code start timing signal.
Figure 5:
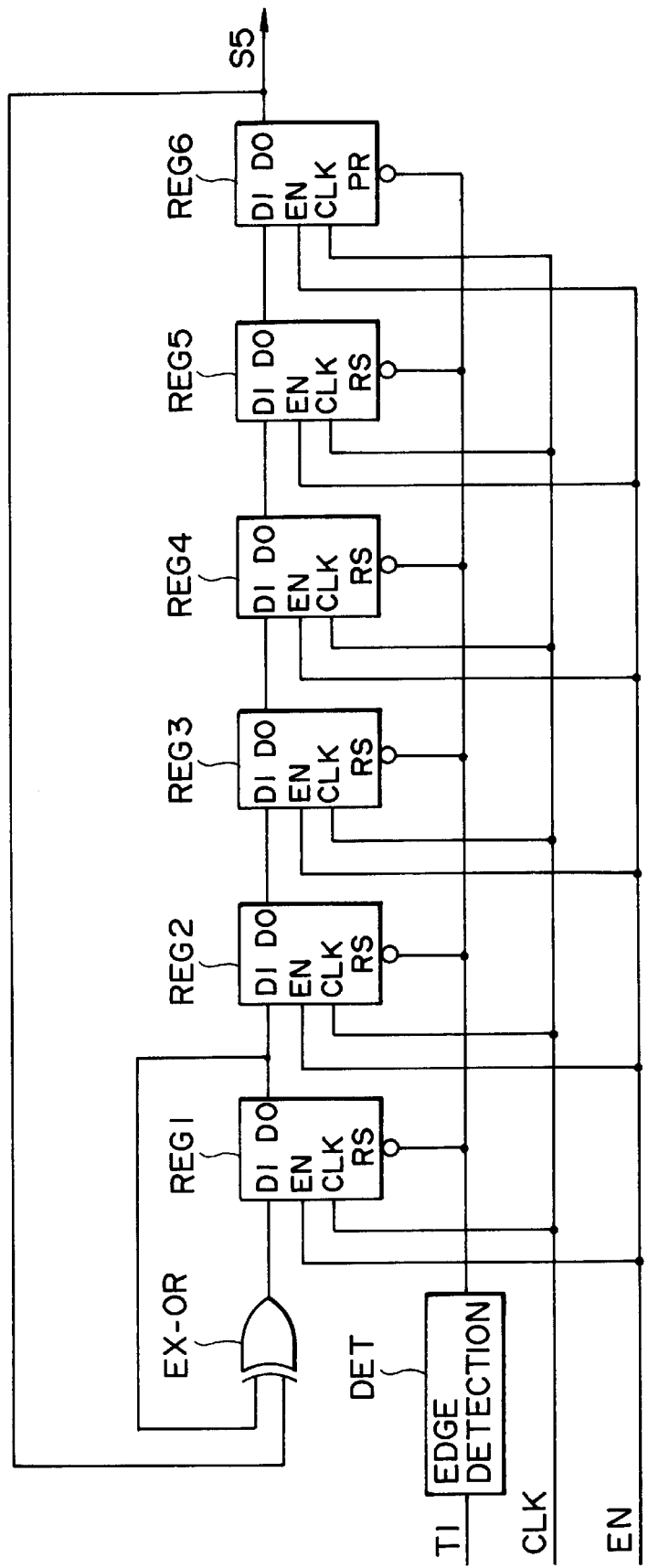
FIG. 5 is a diagram for describing an example of a PN code generator.

FIG. 5 is a diagram for illustrating an example of the PN code generator 153. The PN code generator shown in FIG. 5 comprises an edge detection circuit DET, six D flip-flops REG1 to REG6, and an exclusive OR circuit EX-OR. When it receives the PN code start timing signal T1, clock signal CLK, and enable signal EN as a reset signal, it generates the PN code S5 comprising 63 chips per horizontal interval. In this case, the edge detection circuit DET detects, for example, the rising edge of the PN code start timing signal T1, and starts generation of the PN code every one horizontal interval as shown in FIGS. 4A–4B.

In this case, when the clock rate is of the order of 1 MHz, one period of the PN code is 63/1=63 $\mu$s, so 63 chip PN codes can effectively be contained in one horizontal interval (16.7 $\mu$s). Also, by using the PN code start timing signal T1 as a reset signal, a PN code having a pre-determined code pattern is generated every 1 H from the head.

The PN code inversion timing signal generator 154 generates and outputs a PN code inversion timing signal HT for inverting the PN code based on the horizontal sync signal S4. The PN code inversion timing signal HT divides one chip that is one chip of the PN code into a plurality of divided chips, and the value of the PN code is inverted every plurality of divided intervals. Herein one chip of the PN code is divided into two half chips, and the value of the PN code is inverted every divided interval.

FIGS. 6A to 6D are diagrams for illustrating the relation between the PN code S5, clock signal CLK, and PN code inversion timing signal HT generated in the PN code generator 15.

FIG. 6A shows the PN code S5 which generates in response to the generation start timing supplied from the PN code start timing signal T1 (FIG. 6B) and is generated based on the clock signal CLK (FIG. 6C). FIG. 6D shows an example of the PN code inversion timing signal HT.

As shown in FIGS. 6A, 6B, and 6C, the PN code generation starts based on the rising edge of the PN code start timing signal T1, and one chip of the PN code is generated based on the rising of the clock signal CLK (FIG. 6C). The PN code inversion timing signal HT shown in FIG. 6D is generated in the PN code inversion timing signal generator 154. In this case, the PN code inversion timing signal HT functions to divide one chip into two divided chips so that the value of the PN code is inverted every ½ chip.

The PN code S5 generated in the PN code generator 15 as described herein above and PN code inversion timing signal HT are supplied to the PN code inverter 16.

Based on the inversion timing signal HT, the PN code inverter 16 controls whether or not to inverse the value of the PN code S5 from the PN code generator 15 and generates a PN inversion code S6. As described herein above, the inversion timing signal HT is the signal which inverts every horizontal interval, and the PN code inverter 16 inverts, for example, the value of the PN code S5 in the interval where the inversion timing signal HT is in high level.

For example, when inversion processing of the value of the PN code string is performed based on the PN code inversion timing signal HT (FIG. 7B) which inverts the PN code string shown in FIG. 7A every ½ chip, one chip is divided into two divided chips and the value of the PN code is inverted every ½ chip.

In detail, each chip of the PN code is divided into two divided chips and chip inversion occurs on an alternate divided interval. Therefore, if the PN code is "1", the PN code is divided into two and is changed to "1, 1", and this is subjected to chip inversion on an alternate divided interval, then changed to "1, 0". Similarly, if the PN code is "0", the PN code is divided into two and is changed to "0, 0", and this is subjected to chip inversion on an alternate divided interval, then changed to "0, 1".

As shown in FIGS. 7A to 7C, the value of the PN code is inverted correspondingly to the high level interval of the PN code inversion timing signal HT and low level interval. The PN inversion signal S6 generated in the PN code inverter 16 is supplied to the SS anti-duplication control signal generator 17.

The SS anti-duplication control signal generator 17 spectrally spreads the anti-duplication control signal S3 using the PN inversion code S6 so as to generate a spectrally spread anti-duplication control signal S7, and supplies it to the D/A conversion circuit 192. The D/A conversion circuit 192 converts the spectrally spread signal S7 to an analog signal S7A, and supplies it to the adder 18.

The adder 18 superimposes the analog spectrally spread signal S7A on the analog video signal S2A, and generates and outputs a video signal S8A. The adder 18 therefore functions as superimposing means for superimposing the spectrally spread signal S7A, which is an anti-duplication control signal that has been spectrally spread by the PN inversion code S6, on the analog video signal S2A.

The analog output video signal S8A, formed by superimposing the spectrally spread anti-duplication control signal on the analog video signal, is then supplied to a monitor receiver which displays an image or to the recording device 20 which will be described hereinafter.

Next, the recording device 20 which receives the video signal S8A from the above-mentioned playback device 10 and records it will be described. As shown in FIG. 2, the recording device 20 in this embodiment comprises an encoder 21, sync separator 22, PN code generator 23, PN code inverter 24, detector 25 for detecting the anti-duplication control signal which has been spectrally spread and superimposed on the video signal (referred to as SS anti-duplication control signal detector hereinafter), duplication controller 26 which performs control so as to permit or inhibit duplication, write unit 27 and A/D conversion circuit 291. The recording medium 200 is, for example, a DVD on which the video signal is written by the recording device 20.

The video signal S8A from the playback device 10 is converted to a digital video signal S8 by the A/D conversion circuit 291, and supplied to the encoder 21, sync separator 22, and SS anti-duplication control signal detector 25.

The encoder 21 receives the digital video signal S8, removes the video sync signal, and performs encoding operations such as data compression of the digital video signal, and the encoder 21 generates a digital video signal S9 for recording which is supplied to the recording medium 200 via the write unit 27.

The sync separator 22 removes the video sync signal S11 from the digital video signal S8 prior to encoding operations, and supplies it to the PN code generator 23. In the recording device 20, a horizontal sync signal is used as the video sync signal S11 as in the above-mentioned playback device 10.

The PN code generator 23 has the same structure as the PN code generator 15 of the playback device 10 which was described referring to FIG. 3, and is equivalent to the PN code start timing signal generator 151, PLL circuit 152, PN code generator 153 shown in FIG. 5 and PN code inversion timing signal generator 154. The following description therefore assumes that the PN code generator 23 has the structure of FIG. 3.

In the PN code generator 23, as in the PN code generator 15 of the above-mentioned playback device 10, the PN code start timing signal T1, which starts generation of the PN code every horizontal interval, is generated by the PN code start timing signal generator 151, and a clock signal CLK having a frequency of 1 MHz is generated by the PLL circuit 152. The PN code start timing signal T1 and the clock signal CLK are supplied to the PN code generator 153.

Using the PN code start timing signal T1 and the clock signal CLK, the PN code generator 153 generates the PN code S5 (S12 in FIG. 2). Specifically, the PN code S12 is generated with the same start timing relative to the video signal S8 as the PN code S5 generated in the playback device 10.

The PN code inversion timing signal generator 154 of the PN code generator 23 generates the inversion timing signal HT used in the PN code inverter 24. This inversion timing signal HT is a signal which is inverted every divided interval which has been formed by dividing a chip into two as described herein above.

The PN code S12 and inversion timing signal HT generated in the PN code generator 23 are supplied to the PN code inverter 24.

Similarly to the PN code inverter 16 of the output device 10 described herein above, the PN code inverter 24 inverts the value of the PN code S12 supplied by the PN code generator 23 on an alternate ½ chip according to the PN code inversion timing signal HT so as to generate a PN inversion code S13. The PN inversion code S13 is therefore generated as the same signal as the PN inversion code S6 generated in the output device 10 relative to the video signal S8.

The PN inversion code S13 is supplied to the SS anti-duplication control signal detector 25. The PN inversion code S13 is used as a reference signal of inversion spectral spreading for extracting the anti-duplication control signal which is spread spectrally and superimposed on the video signal S8.

The SS anti-duplication control signal detector 25 functions as inversion spectral spreading means. By performing inversion spectral spreading using the PN inversion code S13, it extracts the anti-duplication control signal which has been spread and superimposed on the video signal S8, and supplies it to the duplication controller 26 as an anti-duplication control signal S14.

Specifically, in the SS anti-duplication control signal detector 25, inversion spectral spreading is performed using the PN inversion code S13 which is generated at the same start timing and same inversion timing as the PN inversion code S6 used for spectral spreading in the output device 10 relative to the video signal S8 on which the spectrally spread anti-duplication control signal is superimposed, and inversion spectral spreading is performed.

In this inversion spectral spreading, as described herein above, the anti-duplication control signal superimposed on the video signal S8 is extracted by multiplying the PN inversion code S13 by the video signal S8 comprising the spectrally spread anti-duplication control signal, and integrating the result. In the inversion spectral spreading, the polarity of the video signal S8 is inverted every ½ chip because the PN inversion code S13 is multiplied.

As described herein above, in this embodiment, 63 chip PN codes are generated per 1 H. One chip PN code corresponds to a video signal of approximately 8 pixels. In the case that the value of the PN code is inverted on alternate ½ chips, the polarity of the video signal changes on alternate four pixels.

The video signal is a signal having a high correlation between adjacent pixels. Therefore, by performing integration as part of the process of inversion spectral spreading, video signal components of different polarity of alternate ½ chips cancel each other out, and are thereby eliminated, and the anti-duplication control signal superimposed on the video signal is extracted without adverse effect of the video signal component.

By canceling out the high level video signal, the anti-duplication control signal, which is spectrally spread and superimposed on the video signal, can be accurately and quickly extracted. The anti-duplication control signal S14 extracted by the SS anti-duplication control signal detector 25 in this way is supplied to the duplication controller 26.

The duplication controller 26 decodes the anti-duplication control signal S14 and determines whether duplication is to be inhibited or permitted. Based on this determination result, a write control signal S15 is generated and supplied to the write unit 27 so as to permit or inhibit writing of the video signal S9.

When the write control signal S15 permits writing, the write unit 27 writes the video signal S9 on the recording medium 200, and when the write control signal inhibits writing, the write unit 27 does not write the video signal S9 on the recording medium 200.

Hence, in the image duplication control system of this embodiment, by starting generation of the PN code every vertical interval based on the horizontal sync signal, generation of the PN code starts at the same timing relative to the video signal in the output device 10 and recording device 20. Moreover, by using a PN code of inverted polarity to the PN code on alternate ½ chips in both the output device 10 and recording device 20, video signal components are canceled out during inversion spectral spreading in the recording device 20 as described herein above, and the anti-duplication control signal which is superimposed on the video signal can be quickly and accurately extracted regardless of the high level video signal component.

Consequently, the anti-duplication control signal S14 which is spectrally spread and superimposed on the video signal S8 is detected with higher efficiency, and the spread gain may be reduced.

Because the anti-duplication control signal which is spectrally spread by the PN inversion code the value of which is inverted on alternate ½ chips in the same chip is superimposed on the video signal, the polarity of the spectrally spread anti-duplication control signal obtained by multiplying this PN inversion code is also inverted similarly on alternate ½ chips. Therefore, the brightness of the superimposed anti-duplication control signal is changed inversely on alternate ½ chips in one chip.

The brightness variation of anti-duplication control signals of chip inversion in one chip is therefore averaged out, so that anti-duplication control signal components are not remarkable visually even when the video signal, on which the anti-duplication control signal is superimposed, is played back.

According to this embodiment, the value of the PN code is inverted on alternate ½ chips, the present invention is by no means limited to this embodiment. For example, one chip may be divided into four and the value of the PN code is inverted on alternate ¼ chips.

In detail, as shown in FIGS. 8A to 8D, each PN code (FIG. 8A) which is generated correspondingly to the clock signal CLK (FIG. 8B) is divided into four, and the PN code inversion timing signal HT (FIG. 8C) which inverts the PN code on alternate ¼ chips is generated. As shown in FIG. 8D, if the PN code of a chip is "1", then the PN code is divided into four by the PN code inversion timing signal HT (FIG. 8C) namely "1, 0, 1, 0", on the other hand, if the PN code of a chip is "0", then the PN code is divided into "0, 1, 0 1".

As described herein above, it is possible to divide one chip into four and the PN code value is inverted on alternate ¼ chips, or it is also possible to divide one chip into more divided chips than two and the PN code is inverted more frequently than in the case of two divided chips. The polarity of adjacent video signals having a higher correlation can be differentiated, and the video signal component is canceled more effectively.

In the above-mentioned embodiment, the case in which the value of the PN code is inverted in one chip is described, however the present invention is by no means limited to this case. For example, the PN code is generated so that consecutive several chips have the same data, and the PN code value may be inverted every chip. For example, the PN code value is the same for consecutive two or four chips, and the PN code value is inverted on an alternate chip.

In the above-mentioned embodiment, cases that one chip is divided into two and that one chip is divided into four are described, however, the present invention is by no means limited to these cases, for example, the PN code of one chip may be divided into divided chips of a prescribed number such as six or eight.

Further, for example, in the case that a one pixel video signal corresponds to the PN code of one chip, the video signal component can be canceled every pixel because the PN code value can be inverted in the same pixel.

On the other hand, in the case that a plurality of pixels corresponds to the PN code of one chip, the video signal component can be canceled effectively between adjacent pixels. For example, in the case that the video signal of eight pixels corresponds to the PN code of one chip, if the PN code of one chip is divided into eight, then the video signal component between adjacent pixels can cancel each other. Of course, even if the PN code of one chip is divided into two or four, the video signal can be canceled effectively because the video signal of high correlation is canceled.

Further, by inverting the PN code value a plurality of times in the PN code of one chip, for example, even if the spectrally spread anti-duplication control signal is superimposed on a quick moving dynamic image, the video signal component can be canceled in a processing unit of a divided interval which is formed by dividing the PN code of one chip into a plurality of divided chips, and the video signal component is canceled efficiently.

Next, another embodiment of the image duplication control system in accordance with the present invention is described. In the above-mentioned embodiment, the generation of the PN code starts every one horizontal interval and the PN code of one chip is divided into a plurality of intervals, and the PN code value is inverted on an alternate one divided interval in one chip, however in the embodiment described hereinafter, generation of the PN code starts every one horizontal interval, and the value of each chip of the PN code is inverted on an alternate one vertical interval.

The output device and recording device in this embodiment have the same structure as the output device 10 and recording device 20 shown in FIG. 1 and FIG. 2. However, operation of the PN code generator 15 of the output device 10 and operation of the PN code generator 23 of the recording device 20 are different in this embodiment. First, the output device 10 of this embodiment is described with reference to FIG. 1.

Similarly to the above-mentioned embodiment, the playback video signal component S2 from the read out unit 11 is supplied to the demodulator 12 and anti-duplication control signal extractor 13. The demodulator 12 performs demodulation processing and a digital video signal including a sync signal is generated. The digital video signal is converted into an analog video signal S2A by the D/A conversion circuit 191. The analog video signal S2A is supplied to the adder 18 and sync separator 14.

The anti-duplication control signal extractor 13 extracts the anti-duplication control signal S3 from the playback video signal component S2 as described herein above, and supplies it to the SS anti-duplication control signal generator 17.

The sync separator 14 of this embodiment extracts the horizontal sync signal and vertical sync signal from the video signal S2A and supplies them to the PN code generator 15.

The PN code generator 15 is provided with the PN code start timing signal generator 151, PLL circuit 152, PN code generator 153, PN code inversion timing signal generator 154 as described herein above with reference to FIG. 3. In this embodiment, the horizontal sync signal is supplied to the PN code start timing signal generator 151 and PLL circuit 152, and the vertical sync signal is supplied to the PN code inversion timing signal generator 154.

As described herein above with reference to FIG. 4, the PN code start timing signal generator 151 generates the PN code start timing signal T2 for starting generation of PN code every one horizontal interval based on the supplied horizontal sync signal. Similarly to the PN code start timing signal generator 151, the PLL circuit 152 generates the clock signal CLK having, for example, a frequency of 1 MHz based on the horizontal sync signal.

The PN code start timing signal T2 and clock signal CLK are supplied to the PN code generator 153. The PN code generator 153 generates the PN code S5 of 63 chips every one horizontal interval in the same way as in the above-mentioned embodiment correspondingly to the PN code start timing signal T1 and clock signal CLK.

In this embodiment, the vertical sync signal is supplied to the PN code inversion timing signal generator 154. The PN code inversion timing signal generator 154 generates the PN code inversion timing signal HT2 based on the vertical sync signal.

FIG. 9 is a diagram for illustrating an example of the PN code inversion timing signal HT2 in this embodiment. The PN code inversion timing signal HT2 of two vertical periods generated based on the front end of the vertical sync signal (FIG. 9A) shown either in FIG. 9B or shown in FIG. 9C may be used. In other words, the PN code may be subjected to chip inversion in either an odd field or an even field.

The PN code S5 and PN code inversion timing signal HT2 generated in the PN code generator 15 are supplied to the PN code inverter 16. The PN code inverter 16 generates the PN inversion code S6 that all chips of the PN code S5 in the vertical interval are inverted on an alternate one vertical interval based on the PN code inversion timing signal HT2, and supplies it to the SS anti-duplication control signal generator 17. Therefore, all the PN codes generated in the vertical interval are subjected to chip inversion on an alternate one vertical interval.

The SS anti-duplication control signal generator 17 spectrally spreads the anti-duplication control signal from the anti-duplication control signal extractor 13 using the PN inversion code S6 to generate the spectrally spread signal S7 of the anti-duplication control signal, and supplies it to the D/A conversion circuit 192. The D/A conversion circuit 192 converts the spectrally spread signal S7 to an analog spectrally spread signal S7A and supplies it to the adder 18.

The adder 18 generates a video signal S8A by superimposing the analog spectrally spread signal S7A on the video signal S2A, and supplies it to a monitor receiver and the recording device 20 in this embodiment.

As described herein above, in the output device 10 used in this embodiment, generation of the PN code is started every one horizontal interval, and the PN inversion code S6 that the chip of the PN code is inverted on an alternate one vertical interval is generated, and spectral spreading is performed on the anti-duplication control signal using the PN inversion code S6. In this embodiment, by using both the horizontal sync signal and vertical sync signal, the output device 10 differentiates the period of start timing of the PN code generation from the period of inversion timing for inverting the chip of the PN code.

Next, the recording device 20 of this embodiment is described with reference to FIG. 2. The sync separator 22, PN code generator 23, and PN code inverter 24 of the recording device 20 of this embodiment are structured in the same way as the sync separator 14, PN code generator 15, and PN code inverter 16 of the output device of this embodiment.

The video signal S8A supplied from the output device 10 of this embodiment is converted into a digital video signal S8 by the A/D conversion circuit 291, and the digital video signal S8 is supplied to the encoder 21, sync separator 22, and SS anti-duplication control signal detector 25.

As described herein above, the encoder 21 receives supply of the digital video signal S8, and performs coding processing such as elimination of the sync signal and data compression of the digital video signal to generate a recording digital video signal S9 and supplies it to the write unit 27.

The sync separator 22 of the recording device 20 of this embodiment receives supply of the A/D converted video signal S8, extracts the horizontal sync signal and vertical sync signal contained in the video signal S8, and supplies them to the PN code generator 23.

The PN code generator 23 generates the PN code generation start timing signal T1 and clock signal CLK based on the horizontal sync signal, and generates the PN code inversion timing signal HT2 based on the reference signal of the vertical sync signal in the same way as the PN code generator 15 of the output device 10 described herein above. The PN code generation timing signal T1, clock signal CLK, and PN code inversion timing signal HT2 generated herein provide the same corresponding timing signal in the output device 10 to the video signal S8.

Therefore, in the SS anti-duplication control signal detector 25 of the recording device 20, the generation of the anti-duplication control signal starts at the same timing as that of the PN inversion code S6 used for spectral spreading in the output device 10, and a PN inversion code S13, the chip of which PN inversion code S13 is inverted at the same timing, is generated. Inversion spectral spreading is performed using the PN inversion code S13.

The anti-duplication control signal S14 which is extracted in the SS anti-duplication control signal detector 25 is supplied to the duplication controller 26, and duplication control of the video signal S8 on the recording medium 200 is performed correspondingly to the anti-duplication control signal.

As described herein above, the recording device 20 of this embodiment starts generation of the PN code every one horizontal interval, and performs inversion spectral spreading using the PN inversion code S13 generated by inverting the chip of the PN code on an alternate one vertical interval.

For inversion spectral spreading, as described herein above, by multiplying the video signal S8 by the PN inversion code S13 and by performing integral processing on the result, the anti-duplication control signal which is spectrally spread and superimposed on the video signal is extracted. In the inversion spectral spreading, the polarity of the video signal S8 is inverted every one vertical interval because the PN inversion code S13 is multiplied.

The video signal is a signal which has a high correlation between adjacent fields as described hereinbefore. Therefore, the video signal components on the adjacent fields which are different in polarity cancel each other and offset by performing integral processing when inversion spectral spreading is performed.

As described herein above, the anti-duplication control signal which is subjected to spectral spreading and superimposed on the video signal is extracted accurately and quickly without adverse effect of the video signal component.

Accordingly, spread gain can be reduced also in this embodiment to the same extent as attained in the case that the value of the PN code is inverted in the PN code of one chip as described herein above.

Further in this embodiment, the spectrally spread anti-duplication control signal is superimposed on the video signal using the PN inversion code which is subjected to chip inversion every one vertical interval. In this case, the polarity of the anti-duplication control signal which is multiplied by the PN inversion code changes every one vertical interval similarly. Therefore, the brightness change of the anti-duplication control signal which is superimposed on the adjacent field having the opposite polarity is averaged because of mutually different polarity. The visual interference on the image due to the superimposed anti-duplication control signal is diminished when the video signal on which the anti-duplication control signal is superimposed is played back.

In this embodiment, for the purpose of description, generation of the PN code is started every one horizontal interval based on the horizontal sync signal, and the chip of the PN code is inverted on an alternate one vertical interval, however, the present invention is by no means limited to the case.

For example, as shown in FIGS. 10A to 10C, the PN code inversion timing signal HT3 having one period of 4 vertical intervals (FIG. 10B) based on the front end of the vertical sync signal (FIG. 10A) is generated and used. By using the PN code inversion timing signal HT3 shown in FIG. 10B, the chip of the PN code is inverted on alternate two vertical intervals.

The PN code inversion timing signal HT3 having one period of 4 vertical intervals is not limited to the signal shown in FIG. 10B, alternatively, the PN code inversion timing signal HT3 having the phase displaced by one vertical interval may be generated and used as shown in FIG. 10C.

As described herein above, by generating such a PN code inversion timing signal HT3 having one period of 4 vertical intervals in the PN code inversion timing signal generator 154 of the PN code generators 15 and 23 of the output device 10 and recording device 20, the chip of the PN code is inverted on alternate two vertical intervals.

In this case, the video signal is a signal having a high correlation between adjacent frames, and the video signal component between adjacent frames which are differentiated in polarity by multiplying the PN code when inversion spectral spreading is performed can be canceled. Therefore also in this case, the anti-duplication control signal which is subjected to spectral spreading and superimposed on the video signal is extracted accurately and quickly.

Of course, because the polarity of the spectrally spread anti-duplication control signal is inverted every frame by multiplying the PN inversion code, the brightness change of the anti-duplication control signal superimposed on the adjacent frames is inverted in polarity, and average each other, and the anti-duplication control signal superimposed on the video signal becomes diminished and does not cause a visual interference.

As described herein above, the PN inversion code may be generated so that the chip is inverted every interval range in which the video signal is correlative. Thereby, the video signal components having opposite polarity in the adjacent intervals offset each other, the anti-duplication control signal which is subjected to spectral spreading and is superimposed on the video signal is extracted accurately and quickly, and the anti-duplication control signal which is subjected to spectral spreading using the PN inversion code does not deteriorate the image.

In this embodiment, the PN code start timing signal T1 is generated based on the horizontal sync signal, and the PN code inversion timing signal HT 2 is generated based on the vertical sync signal, however, the present invention is by no means limited to the case.

In another manner, the PN code start timing signal T1 may be generated based on the vertical sync signal and the PN code inversion timing signal HT may be generated based on the horizontal sync signal. For example, generation of the PN code is started every one vertical interval so that the PN code chip is inverted on an alternate one horizontal interval.

Of course, generation of the PN code may be started every two vertical intervals so that the PN code chip value is inverted on alternate two horizontal intervals, or generation of the PN code may be started every one vertical interval so that the PN code chip value is inverted on alternate two horizontal intervals.

In the case that the PN code chip value is inverted at the timing based on the horizontal sync signal as described herein above, because the video signal component is canceled due to correlation between horizontal scanning lines of the video signal (line correlation), the anti-duplication control signal which is subjected to spectral spreading and superimposed on the video signal is extracted accurately and quickly as described herein above.

The PN code generation start timing is not limited to the above-mentioned case of every one horizontal interval or every two horizontal intervals, generation of the PN code may be started every plurality of horizontal intervals such as every three horizontal intervals, or every four horizontal intervals.

Of course, in the case that the PNcode start timing signal is generated based on the vertical sync signal, the PN code generation may be started every one vertical interval or every two vertical intervals, or the PN code generation may be started every plurality of vertical intervals such as three vertical intervals or four vertical intervals.

Further, the PN code generation may be started every one-over-a-plural (1/plural) horizontal interval or every one-over-a-plural (1/plural) vertical interval such as every ½ horizontal interval, every ¼ horizontal interval, every ½ vertical interval, or every ¼ vertical interval.

Similar to the PN code generation start timing, the PN code inversion timing is by no means limited to the inversion on an alternate one horizontal interval and on alternate two horizontal intervals, the PN code chip may be inverted on alternate plurality of horizontal intervals such as on alternate three horizontal intervals or on alternate four horizontal intervals.

Of course, in the case that the PN code inversion timing signal is generated based on the vertical sync signal, the PN code chip is inverted on an alternate one vertical interval or on alternate two vertical intervals, or the PN code chip is inverted on alternate plurality of vertical intervals such as on alternate three vertical intervals or four vertical intervals.

Alternatively, the PN code generation may be started on an alternate 1/N (N is an integer of two or larger) horizontal interval or on an alternate 1/N vertical interval such as on an alternate ½ horizontal interval, on an alternate ¼ horizontal interval, on an alternate ½ vertical interval, or on an alternate ¼ vertical interval.

Further, by generating the PN code start timing signal (FIG. 11C) which starts generation of the PN code every specified horizontal interval (FIG. 11B) in each vertical interval (FIG. 11A) as shown in FIG. 11, the PN code generation may be started every predetermined horizontal interval between each vertical interval.

In this case, in the PN code start timing signal generator 151 of the PN code generators 15 and 23 of the output device 10 and recording device 20, the PN code start timing signal T1 may be generated using both the vertical sync signal and horizontal sync signal.

In this case, the PN code chip may be inverted at the inversion timing in one PN code chip, or the PN code chip may be inverted based on the horizontal sync signal or vertical sync signal such as on an alternate one vertical interval or on an alternate one horizontal interval.

Both the PN code start timing and the PN code inversion timing may be set using the horizontal sync signal or vertical sync signal, and may have different periods respectively.

In the above-mentioned embodiment, the PN code start timing signal T1 and PN code inversion timing signals HT2 and HT3 are generated based on the front end of the video sync signal, however, the present invention is by no means limited to the case, rather the phase of signals may be relatively shifted differently between the respective signals, for example, the signals may be generated based on positions which are shifted on alternate clocks respectively from the front end of the video sync signal.

In the above-mentioned embodiment, the case of the anaog connection that analog video signals are supplied from the output device to the recording device is described for convenience of description, however, the present invention may be applied to the case of digital connection.

Further in the above-mentioned embodiment, the output device 10 and recording device 20 are DVD devices for the purpose of description, however, the output device and recording device are by no means limited to the DVD device, but the present invention may be applied to the case that the output device and recording device are VTR, digital VTR, video disk, and video CD. In other words, the present invention may be applied to analog devices such as an analog VTR and also to digital devices such as DVD.

Further in the above-mentioned embodiment, the case that the anti-duplication control signal added to the video signal of the recording medium 100 is extracted, subjected to spectral spreading using the PN inversion code S6, and superimposed on the video signal to be supplied to the recording device 20 is described, however instead, the recording medium on which the spectrally spread anti-duplication control signal is previously superimposed may be used.

In the case of the recording medium on which the previously spectrally spread anti-duplication control signal is previously superimposed as described herein above, extraction of the anti-duplication control signal, spectral spreading of the anti-duplication control signal, and superimposition of the spectrally spread anti-duplication control signal on the video signal are not necessary unlike the above-mentioned output device 10.

In this case, in the recording device 20, generation of the PN code is started at the same timing as that of the PN inversion code used for spectral spreading of the anti-duplication control signal which is subjected to spectral spreading and superimposed previously on the video signal recorded on the recording medium, and inversion spectral spreading may be performed using the PN inversion code which inverts the chip value every same timing.

In the case that the spectrally spread anti-duplication control signal is previously superimposed on the video signal recorded on the recording medium as described herein above, processing on the anti-duplication control signal can be eliminated in the output device as described herein above, and as long as the recording device side is provided with the function to perform inversion spectral spreading and to extract the anti-duplication control signal, the anti-duplication control signal superimposed previously on the video signal is extracted effectively and duplication control is performed.

The structure wherein an anti-duplication control signal generator is provided in the output device, the anti-duplication control signal generated in the output device is subjected to spectral spreading using the PN inversion code and superimposed on the video signal and then outputted, may be used.

In the case that such structure is used, under the conditions that the anti-duplication control signal is not recorded originally on the recording medium and that the spectrally spread anti-duplication control signal is not superimposed, duplication control can be performed in the recording device using the anti-duplication control signal which is generated in the output device and to be superimposed on the video signal.

Alternatively, the following processing may be used instead of the process used in the above-mentioned embodiment that the chip of the PN inversion code is inverted every timing based on the video sync signal.

For example, the spectrally spread anti-duplication control signal is previously superimposed on an alternate one field of the video signal. When inversion spectral spreading of the recording device is performed, the video signal on which the spectrally spread anti-duplication control signal is superimposed is multiplied by the PN code having the same generation start timing and the same generation speed as those of the PN code used for spectral spreading in the playback device, thereinafter, subtraction processing is performed between the video signal of the field on which the anti-duplication control signal is superimposed and the video signal of the adjacent field on which the anti-duplication control signal is not superimposed.

Thereby, the video signal components of the adjacent fields (vertical interval) having a high correlation are canceled, and the anti-duplication control signal superimposed on the video signal is extracted efficiently. Of course such substraction processing may be performed between adjacent frames, between adjacent horizontal intervals (horizontal line), between adjacent pixels, or between a plurality of neighboring pixels.

Further in the above-mentioned embodiment, the case that the output device and recording device are DVD devices of a anti-duplication control device is described, however, the present invention is by no means limited to the case. For example, the present invention may be applied to the output device of the broadcasting station side for transmitting the television signal on which the spectrally spread anti-duplication control signal is superimposed. On the receiving side, it is possible to perform inversion spectral spreading and then extract the anti-duplication control signal which is superimposed on the video signal so that anti-duplication control is performed based on the anti-duplication control signal.

Of course the present invention may be applied to the output device and reception device for transmitting and receiving an image in the case that the analog video signal is transmitted/received through a cable as in the cable television system.

As described hereinbefore, according to the image transmission method, image anti-duplication method, image anti-duplication device, and image recording medium in accordance with the present invention, because the spreading code is generated at the timing based on the video sync signal, the spreading code generation can be started at the same timing as that of the video sync signal on the output side and reception side of the video signal. Thus inversion spectral spreading in the recording device is performed quickly.

Further, each chip of the spreading code used for spectral spreading and of the spreading code for inversion spreading used for inversion spectral spreading is divided into a plurality of divided chips, the inversion spreading code in that the original spreading code chip value is inverted (chip inversion) every such divided interval is generated, and this inversion spreading code is used for spectral spreading and also for inversion spectral spreading. Thereby, when inversion spectral spreading is performed, the polarity of the video signal component is inverted correspondingly to chip inversion of the spreading code. Therefore, by performing integral processing for inversion spectral spreading, the video signal component of the adjacent divided intervals having the inverted polarity of each other is canceled, and thus the additional information which is subjected to spectral spreading and superimposed on the video signal (anti-duplication control signal) is extracted without severe adverse effect of the video signal component.

Thereby, inversion spectral spreading is performed accurately and quickly, detection efficiency of additional information which is subjected to spectral spreading and superimposed on the video signal is improved, and spread gain is reduced when performing spectral spreading.

Further, the polarity of the anti-duplication control signal which is subjected to spectral spreading by multiplying the inversion spreading code is inverted correspondingly to the spreading code. Therefore, because the brightness change of the adjacent anti-duplication control signals having different polarity is averaged, the video signal is not deteriorated in spite of the video signal on which the anti-duplication control signal is superimposed.

Further, in the case that generation of the spreading code is started at the timing based on the horizontal sync signal and the spreading code chip value is inverted at the timing based on the vertical sync signal, conversely, also in the case that generation of spreading code is started at the timing based on the vertical sync signal and the spreading code chip is inverted at the timing based on the horizontal signal, the detection efficiency of the additional information is improved and spread gain is reduced as described herein above. The additional information which is subjected to spectral spreading and superimposed on the video signal is reduced visually, and the additional information does not cause visual interference.

What is claimed is:

1. A video signal transmission method for transmitting a video signal superimposed with a spectrally spread additional information signal, comprising the steps of:

generating a spreading code for spectral spreading at a timing based on a sync signal of said video signal;

generating a first inversion spreading code formed by dividing an interval of each of a plurality of chips of said spreading code into a plurality of N, N being an integer of at least 2, divided intervals and by allocating alternately a value of each of said plurality of chips and an inverted value of said value of said each of said plurality of chips to said plurality of N divided intervals;

performing spectral spreading on an additional information signal using said first inversion spreading code; and superimposing the spectrally spread additional information signal on the video signal.

2. The video signal transmission method as set forth in claim 1, wherein the spreading code for spectral spreading is generated for each of a plurality of sync signals of the video signal.

3. The video signal transmission method as set forth in claim 1, wherein said video signal transmission method further comprises the steps of:

receiving the video signal including the spreading code for spectral spreading;

detecting the sync signal from the received video signal;

generating a second inversion spreading code for inversion spectral spreading corresponding to the first inversion spreading code based on the detected sync signal; and extracting the additional information signal by performing inversion spectral spreading on the received video signal using said second inversion spreading code for inversion spectral spreading.

4. The video signal transmission method as set forth in claim 3, wherein the additional information signal is a duplication control signal, and said video signal transmission method further comprises the step of:

controlling one of recording inhibition on a recording medium, recording permission, and recording restriction on a number of recordings based on said duplication control signal.

5. A video signal output device comprising:

spreading code generation means for generating a spreading code for spectral spreading at a timing based on a sync signal of a video signal;

inversion spreading code generation means for generating a first inversion spreading code formed by dividing an interval of each of a plurality of chips of said spreading code into a plurality of N, N being an integer of at least 2, divided intervals and by allocating alternately a value of each of said plurality of chips and an inverted value of said value of said each of said plurality of chips to said plurality of N divided intervals;

spectral spreading means for performing spectral spreading on an additional information signal using said first inversion spreading code;

superimposing means for superimposing the spectrally spread additional information signal on the video signal; and output means for outputting the video signal superimposed with the spectrally spread additional information signal.

6. The video signal output device as set forth in claim 5, wherein the spreading code for spectral spreading is generated for each of a plurality of sync signals of the video signal.

7. The video signal output device as set forth in claim 5, wherein the additional information signal is a duplication control signal for controlling one of recording inhibition on a recording medium, recording permission, and recording restriction on a number of recordings.

8. A video signal receiving device for receiving an analog video signal superimposed with a spectrally spread additional information signal using a first inversion spreading code formed by dividing an interval of each of a plurality of chips of a spreading code for spectral spreading generated at a timing based on a sync signal of the analog video signal into a plurality of N, N being an integer of at least 2, divided intervals and by allocating alternately a value of each of said plurality of chips and an inverted value of said value of said each of said plurality of chips to said plurality of N divided intervals, comprising:

sync detection means for detecting the sync signal from the received analog video signal;

inversion spreading code generation means for generating a second inversion spreading code for inversion spectral spreading corresponding to the first inversion spreading code based on the detected sync signal; and inversion spectral spreading means for performing inversion spectral spreading on the received analog video signal using said second inversion spreading code for inversion spectral spreading, and for extracting the additional information signal.

9. The video signal receiving device as set forth in claim 8, wherein the spreading code for spectral spreading is generated for each of a plurality of sync signals of the analog video signal.

10. The video signal receiving device as set forth in claim 8, wherein the additional information signal is a duplication control signal, and said video signal receiving device further includes duplication control means for controlling one of recording inhibition on a recording medium, recording permission, and recording restriction on a number of recordings dependently on said duplication control signal.

11. A video signal duplication control system comprising:

a video signal output device for outputting a video signal; and a video signal receiving device for receiving the video signal and for recording the video signal on a recording medium, wherein said video signal output device includes spreading code generation means for generating a spreading code for spectral spreading at a timing based on a sync signal of the video signal, inversion spreading code generation means for generating a first inversion spreading code formed by dividing an interval of each of a plurality of chips of said spreading code into a plurality of N, N being an integer of at least 2, divided intervals and by allocating alternately a value of each of said plurality of chips and an inverted value of said value of said each of said plurality of chips to said plurality of N divided intervals, spectral spreading means for performing spectral spreading on a duplication control signal for controlling one of recording inhibition on a recording medium, recording permission, and recording restriction on a number of recordings using said first inversion spreading code, superimposing means for superimposing a spectrally spread additional information signal on the video signal, wherein said spectrally spread additional information signal is said duplication control signal and output means for outputting the video signal superimposed with the spectrally spread additional information signal, and wherein said video signal receiving means includes reception means for receiving the video signal outputted from the output means, sync detection means for detecting the sync signal from the received video signal, inversion spreading code generation means for generating a second inversion spreading code for inversion spectral spreading corresponding to the first inversion spreading code based on the detected sync signal, inversion spectral spreading means for extracting the received duplication control signal using said second inversion spreading code for inversion spectral spreading and duplication control means for controlling recording of the video signal on the recording medium based on the extracted duplication control signal.

12. An information superimposition extraction system comprising:

an information superimposition device for superimposing an additional information signal on a video signal; and an information extraction device for extracting the additional information signal from the video signal, wherein said information superimposition device includes spreading code generation means for generating a spreading code for spectral spreading at a timing based on a sync signal of the video signal, inversion spreading code generation means for generating a first inversion spreading code formed by dividing an interval of each of a plurality of chips of said spreading code into a plurality of N, N being an integer of at least 2, divided intervals and by allocating alternately a value of each of said plurality of chips and an inverted value of said value of said each of said plurality of chips to said plurality of N divided intervals, spectral spreading means for performing spectral spreading on the additional information signal to be superimposed on the video signal using said first inversion spreading code, superimposing means for superimposing the spectrally spread additional information signal on the video signal and output means for outputting the video signal superimposed with the spectrally spread additional information signal, and wherein said information extraction device includes reception means for receiving the video signal outputted from the output means, sync detection means for detecting the sync signal from the received video signal, inversion spreading code generation means for generating a second inversion spreading code for inversion spectral spreading corresponding to the first inversion spreading code based on the detected sync signal and inversion spectral spreading means for extracting the additional information signal from the video signal by performing inversion spectral spreading on the received video signal using said second inversion spreading code for inversion spectral spreading.

13. A recording medium for recording a video signal, wherein said video signal is superimposed with a spectrally spread additional information signal using an inversion spreading code formed by dividing an interval of each of a plurality of chips of a spreading code generated based on a sync signal of the video signal into a plurality of N, N being an integer of at least 2, divided intervals and by allocating alternately a value of each of said plurality of chips and an inverted value of said value of said each of said plurality of chips to said plurality of N divided intervals.

14. A video signal transmission method for transmitting a video signal superimposed with a spectrally spread additional information signal, comprising the steps of:

generating a spreading code for spectral spreading at a timing based on one of a horizontal sync signal and a vertical sync signal of the video signal;

generating a first inversion spreading code by inverting a phase of the spreading code at the timing based on the other of said one of said horizontal sync signal and said vertical sync signal of the video signal;

performing spectral spreading on an additional information signal using said first inversion spreading code; and superimposing the spectrally spread additional information signal on the video signal.

15. The video signal transmission method as set forth in claim 14, wherein said video signal transmission method further comprises:

receiving the video signal superimposed with the spectrally spread additional information signal;

detecting the horizontal sync signal and said vertical sync signal from the received video signal;

generating a second inversion spreading code for inversion spectral spreading corresponding to the first inversion spreading code based on the detected horizontal sync signal and said detected vertical sync signal; and extracting the additional information signal by performing inversion spectral spreading on the received video signal using said second inversion spreading code for inversion spectral spreading.

16. The video signal transmission method as set forth in claim 15, wherein the additional information signal is a duplication control signal, and said video signal transmission method further comprises the step of:

controlling one of recording inhibition on a recording medium, recording permission, and recording restriction on a number of recordings based on said duplication control signal.

17. A video signal output device comprising:

spreading code generation means for generating a spreading code for spectral spreading at a timing based on one of a horizontal sync signal and a vertical sync signal of a video signal;

inversion spreading code generation means for generating a first inversion spreading code by inverting a phase of the spreading code at the timing based on the other of said one of said horizontal sync signal and said vertical sync signal of the video signal;

spectral spreading means for performing spectral spreading on an additional information signal using said first inversion spreading code generated by said inversion spreading code generation means;

superimposition means for superimposing the spectrally spread additional information signal on the video signal; and output means for outputting the video signal superimposed with the spectrally spread additional information signal.

18. The video signal output device as set forth in claim 17, wherein the additional information signal is a duplication control signal for controlling one of recording inhibition on a recording medium, recording permission, and recording restriction on a number of recordings.

19. A video signal reception device for receiving an analog video signal superimposed with an additional information signal spectrally spread using a first inversion spreading code formed by inverting a phase of a spreading code for spectral spreading generated at a timing based on one of the horizontal sync signal and vertical sync signal of the analog video signal at the timing based on the other of said one of said horizontal sync signal and said vertical sync signal, comprising:

sync detection means for detecting the horizontal sync signal and said vertical sync signal from the received analog video signal;

inversion spreading code generating means for generating a second inversion spreading code for inversion spectral spreading corresponding to the first inversion spreading code based on one of the detected horizontal sync signal and said vertical sync signal; and inversion spectral spreading means for performing inversion spectral spreading on the received video signal and for extracting an additional information signal using said second inversion spreading code for inversion spectral spreading.

20. The video signal reception device as set forth in claim 19, wherein said video signal reception device further includes duplication control means for controlling one of recording inhibition on a recording medium, recording permission, and recording restriction on a number of recordings dependently on a duplication control signal.

21. A video signal duplication control system comprising:

a video signal output device for outputting a video signal; and a video signal reception device for receiving the video signal and recording the video signal on a recording medium, wherein said video signal output device includes spreading code generation means for generating a spreading code for spectral spreading at a timing based on one of a horizontal sync signal and a vertical sync signal of the video signal, inversion spreading code generation means for generating a first inversion spreading code by inverting a phase of the spreading code at the timing based on the other of said one of said horizontal sync signal and said vertical sync signal of the video signal, spectral spreading means for performing spectral spreading on a duplication control signal for controlling one of recording inhibition on a recording medium, recording permission, and recording restriction on a number of recordings using said first inversion spreading code generated by said inversion spreading code generation means, superimposition means for superimposing a spectrally spread additional information signal on the video signal, wherein said spectrally spread additional information signal is said duplication control signal and output means for outputting the video signal superimposed with the spectrally spread additional information signal, and wherein said video signal reception device includes sync detection means for detecting the horizontal sync signal and said vertical sync signal from the received video signal, inversion spreading code generating means for generating a second inversion spreading code for inversion spectral spreading corresponding to the first inversion spreading code based on one of the detected horizontal sync signal and said detected vertical sync signal, inversion spectral spreading means for performing inversion spectral spreading on the received video signal and for extracting the additional information signal using said second inversion spreading code for inversion spectral spreading and duplication control means for controlling recording of the video signal on the recording medium based on the extracted duplication control signal.

22. An information superimposition extraction system comprising:

an information superimposition device for superimposing an additional information signal on a video signal; and an information extraction device for extracting the additional information signal from the video signal, wherein said information superimposition device includes spreading code generation means for generating a spreading code for spectral spreading at a timing based on one of a horizontal sync signal and a vertical sync signal of the video signal, inversion spreading code generation means for generating a first inversion spreading code by inverting a phase of the spreading code at the timing based on the other of said one of said horizontal sync signal and said vertical sync signal of the video signal, spectral spreading means for performing spectral spreading on the additional information signal using said first inversion spreading code generated by said inversion spreading code generation means, superimposition means for superimposing the spectrally spread additional information signal on the video signal and output means for outputting the video signal superimposed with the spectrally spread additional information signal, and wherein said information extraction device includes reception means for receiving the video signal outputted from the information superimposition device, sync detection means for detecting the horizontal sync signal and said vertical sync signal from the received video signal, inversion spreading code generating means for generating a second inversion spreading code for inversion spectral spreading corresponding to the first inversion spreading code based on one of the detected horizontal sync signal and said detected vertical sync signal and inversion spectral spreading means for extracting the additional information signal from the video signal by performing inversion spectral spreading on the received video signal using said second inversion spreading code for inversion spectral spreading.

* * * * *